US007965222B2

(12) United States Patent
Pitt et al.

(10) Patent No.: US 7,965,222 B2
(45) Date of Patent: Jun. 21, 2011

(54) CELLULAR AUGMENTED RADAR/LASER DETECTOR

(75) Inventors: Lance Douglas Pitt, Kent, WA (US);
Sarah Jean Lawrence, Renton, WA (US); Daniel D. DeLapp, Woodinville, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

(21) Appl. No.: 12/801,163

(22) Filed: May 26, 2010

(65) Prior Publication Data

US 2010/0238065 A1    Sep. 23, 2010

Related U.S. Application Data

(63) Continuation of application No. 12/289,116, filed on Oct. 21, 2008, now Pat. No. 7,764,219, which is a continuation of application No. 11/400,278, filed on Apr. 10, 2006, now Pat. No. 7,471,236.

(60) Provisional application No. 60/777,541, filed on Mar. 1, 2006.

(51) Int. Cl.
*G01S 7/42* (2006.01)
*G01S 13/00* (2006.01)
*H04W 36/00* (2009.01)
*H04W 24/00* (2009.01)

(52) U.S. Cl. .............. 342/20; 342/57; 342/58; 455/440; 455/456.1; 455/456.6

(58) Field of Classification Search .................... 342/20, 342/57, 58; 455/440, 456.1, 456.6
See application file for complete search history.

(56) References Cited

U.S. PATENT DOCUMENTS

| 4,445,118 A | 4/1984 | Taylor |
| 4,928,107 A | 5/1990 | Kuroda |
| 4,972,484 A | 11/1990 | Theile |
| 5,126,722 A | 6/1992 | Kamis |
| 5,283,570 A | 2/1994 | DeLuca |
| 5,301,354 A | 4/1994 | Schwendeman |
| 5,311,516 A | 5/1994 | Kuznicki |
| 5,327,529 A | 7/1994 | Fults |
| 5,335,246 A | 8/1994 | Yokev |
| 5,351,235 A | 9/1994 | Lahtinen |
| 5,365,451 A | 11/1994 | Wang |
| 5,418,537 A | 5/1995 | Bird |
| 5,422,813 A | 6/1995 | Schuchman |
| 5,479,408 A | 12/1995 | Will |
| 5,485,163 A | 1/1996 | Singer et al. |

(Continued)

OTHER PUBLICATIONS

B.W. Parkinson et al., Global Positioning System: Theory and Applications, vol. 1, Progress in Astronautics and Aeronautics, vol. 163, American Institute of Aeronautics and Astronautics, Inc., p. 184-187, 1996.

*Primary Examiner* — Thomas H Tarcza
*Assistant Examiner* — Peter Bythrow
(74) *Attorney, Agent, or Firm* — William H. Bollman

(57) ABSTRACT

A radar/laser emission detector is augmented with a cellular communications capability to provide the capability to share emission detection information amongst drivers to give other drivers even more advanced warning. A network of a plurality of cellular augmented radar/laser emission detector devices may be formed, each having the capability to source the location of radar or laser emission detections to others requesting access to such information, and each being warned when within a proximity of a recent radar or laser emission detection reported by at least one of the plurality of hybrid radar/laser detector devices.

11 Claims, 6 Drawing Sheets

U.S. PATENT DOCUMENTS

| | | |
|---|---|---|
| 5,504,491 A | 4/1996 | Chapman |
| 5,506,886 A | 4/1996 | Maine |
| 5,517,199 A | 5/1996 | DiMattei |
| 5,530,655 A | 6/1996 | Lokhoff |
| 5,530,914 A | 6/1996 | McPheters |
| 5,539,395 A | 7/1996 | Buss |
| 5,539,829 A | 7/1996 | Lokhoff |
| 5,546,445 A * | 8/1996 | Dennison et al. ............. 455/408 |
| 5,568,153 A | 10/1996 | Beliveau |
| 5,583,774 A | 12/1996 | Diesel |
| 5,594,780 A | 1/1997 | Weideman |
| 5,606,618 A | 2/1997 | Lokhoff |
| 5,629,693 A | 5/1997 | Janky |
| 5,633,630 A | 5/1997 | Park |
| 5,636,276 A | 6/1997 | Brugger |
| 5,661,652 A | 8/1997 | Sprague |
| 5,661,755 A | 8/1997 | Van de Kerkhof |
| 5,689,245 A | 11/1997 | Noreen |
| 5,699,053 A | 12/1997 | Jonsson |
| 5,704,029 A | 12/1997 | Wright, Jr. |
| 5,721,781 A | 2/1998 | Deo et al. |
| 5,731,785 A | 3/1998 | Lemelson |
| 5,765,152 A | 6/1998 | Erickson |
| 5,771,353 A | 6/1998 | Eggleston |
| 5,774,670 A | 6/1998 | Montulli |
| 5,809,415 A | 9/1998 | Rossman |
| 5,812,086 A | 9/1998 | Bertiger |
| 5,812,087 A | 9/1998 | Krasner |
| 5,841,396 A | 11/1998 | Krasner |
| 5,857,201 A | 1/1999 | Wright, Jr. et al. |
| 5,864,667 A | 1/1999 | Barkam |
| 5,874,914 A | 2/1999 | Krasner |
| 5,896,369 A | 4/1999 | Warsta |
| 5,898,391 A | 4/1999 | Jeffries |
| 5,922,074 A | 7/1999 | Richard |
| 5,930,250 A | 7/1999 | Klok |
| 5,945,944 A | 8/1999 | Krasner |
| 5,946,629 A | 8/1999 | Sawyer |
| 5,950,137 A | 9/1999 | Kim |
| 5,960,362 A | 9/1999 | Grob |
| 5,983,099 A | 11/1999 | Yao |
| 5,999,124 A | 12/1999 | Sheynblat |
| 6,032,051 A | 2/2000 | Hall |
| 6,052,081 A | 4/2000 | Krasner |
| 6,058,338 A | 5/2000 | Agashe |
| 6,061,018 A | 5/2000 | Sheynblat |
| 6,064,336 A | 5/2000 | Krasner |
| 6,067,045 A | 5/2000 | Castelloe |
| 6,081,229 A | 6/2000 | Soliman |
| 6,085,320 A | 7/2000 | Kaliski, Jr. |
| 6,118,403 A * | 9/2000 | Lang .................. 342/357.31 |
| 6,121,923 A | 9/2000 | King |
| 6,124,810 A | 9/2000 | Segal |
| 6,131,067 A | 10/2000 | Girerd |
| 6,133,874 A | 10/2000 | Krasner |
| 6,134,483 A | 10/2000 | Vayanos |
| 6,147,598 A | 11/2000 | Murphy |
| 6,150,980 A | 11/2000 | Krasner |
| 6,154,172 A | 11/2000 | Piccionelli |
| 6,169,901 B1 | 1/2001 | Boucher |
| 6,169,902 B1 | 1/2001 | Kawamoto |
| 6,178,506 B1 | 1/2001 | Quick, Jr. |
| 6,185,427 B1 | 2/2001 | Krasner |
| 6,188,354 B1 | 2/2001 | Soliman |
| 6,188,909 B1 | 2/2001 | Alanara |
| 6,189,098 B1 | 2/2001 | Kaliski, Jr. |
| 6,195,557 B1 | 2/2001 | Havinis |
| 6,204,798 B1 * | 3/2001 | Fleming, III .................. 342/20 |
| 6,205,330 B1 | 3/2001 | Winbladh |
| 6,208,290 B1 | 3/2001 | Krasner |
| 6,215,441 B1 | 4/2001 | Moeglein |
| 6,239,742 B1 | 5/2001 | Krasner |
| 6,247,135 B1 | 6/2001 | Feague |
| 6,249,873 B1 | 6/2001 | Richard |
| 6,252,544 B1 * | 6/2001 | Hoffberg ................ 342/357.31 |
| 6,253,203 B1 | 6/2001 | O'Flaherty |
| 6,260,147 B1 | 7/2001 | Quick, Jr. |
| 6,275,692 B1 | 8/2001 | Skog |
| 6,275,849 B1 | 8/2001 | Ludwig |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat |
| 6,321,257 B1 | 11/2001 | Kotala |
| 6,324,542 B1 | 11/2001 | Wright, Jr. et al. |
| 6,327,473 B1 | 12/2001 | Soliman |
| 6,333,919 B2 | 12/2001 | Gaffney |
| 6,360,093 B1 | 3/2002 | Ross |
| 6,360,102 B1 | 3/2002 | Havinis |
| 6,363,254 B1 | 3/2002 | Jones |
| 6,367,019 B1 | 4/2002 | Ansell |
| 6,377,209 B1 | 4/2002 | Krasner |
| 6,400,304 B1 * | 6/2002 | Chubbs, III .................... 342/20 |
| 6,400,314 B1 | 6/2002 | Krasner |
| 6,400,958 B1 | 6/2002 | Isomursu |
| 6,411,254 B1 | 6/2002 | Moeglein |
| 6,421,002 B2 | 7/2002 | Krasner |
| 6,429,812 B1 * | 8/2002 | Hoffberg ................ 342/357.31 |
| 6,430,504 B1 | 8/2002 | Gilbert |
| 6,433,734 B1 | 8/2002 | Krasner |
| 6,442,391 B1 | 8/2002 | Johansson |
| 6,449,473 B1 | 9/2002 | Raivisto |
| 6,449,476 B1 | 9/2002 | Hutchison, IV |
| 6,456,852 B2 | 9/2002 | Bar |
| 6,463,272 B1 | 10/2002 | Wallace |
| 6,477,150 B1 | 11/2002 | Maggenti |
| 6,504,491 B1 | 1/2003 | Christians |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,466 B2 | 2/2003 | Pande |
| 6,522,682 B1 | 2/2003 | Kohli |
| 6,525,687 B2 | 2/2003 | Roy |
| 6,525,688 B2 | 2/2003 | Chou |
| 6,529,829 B2 | 3/2003 | Turetzky |
| 6,531,982 B1 | 3/2003 | White |
| 6,538,757 B1 | 3/2003 | Sansone |
| 6,539,200 B1 | 3/2003 | Schiff |
| 6,539,304 B1 | 3/2003 | Chansarkar |
| 6,542,464 B1 | 4/2003 | Takeda |
| 6,542,734 B1 | 4/2003 | Abrol |
| 6,542,743 B1 | 4/2003 | Soliman |
| 6,549,776 B1 | 4/2003 | Joong |
| 6,549,844 B1 | 4/2003 | Egberts |
| 6,556,832 B1 | 4/2003 | Soliman |
| 6,560,461 B1 | 5/2003 | Fomukong |
| 6,560,534 B2 | 5/2003 | Abraham |
| 6,567,035 B1 * | 5/2003 | Elliott ............................. 342/20 |
| 6,570,530 B2 | 5/2003 | Gaal |
| 6,574,558 B2 | 6/2003 | Kohli |
| 6,580,390 B1 | 6/2003 | Hay |
| 6,584,552 B1 | 6/2003 | Kuno et al. |
| 6,594,500 B2 | 7/2003 | Bender |
| 6,597,311 B2 | 7/2003 | Sheynblat |
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,618,670 B1 | 9/2003 | Chansarkar |
| 6,621,452 B2 | 9/2003 | Knockheart |
| 6,628,233 B2 | 9/2003 | Knockheart |
| 6,633,255 B2 | 10/2003 | Krasner |
| 6,640,184 B1 | 10/2003 | Rabe |
| 6,650,288 B1 | 11/2003 | Pitt |
| 6,661,372 B1 | 12/2003 | Girerd |
| 6,665,539 B2 | 12/2003 | Sih |
| 6,665,541 B1 | 12/2003 | Krasner |
| 6,671,620 B1 | 12/2003 | Garin |
| 6,677,894 B2 | 1/2004 | Sheynbalt |
| 6,680,694 B1 | 1/2004 | Knockheart |
| 6,680,695 B2 | 1/2004 | Turetzky |
| 6,687,504 B1 * | 2/2004 | Raith ......................... 455/456.1 |
| 6,691,019 B2 | 2/2004 | Seeley |
| 6,694,258 B2 | 2/2004 | Johnson |
| 6,697,629 B1 | 2/2004 | Grilli |

| | | |
|---|---|---|
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | van Diggelen |
| 6,704,651 B2 | 3/2004 | Van Diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynblat |
| 6,721,578 B2 | 4/2004 | Minear |
| 6,721,871 B2 | 4/2004 | Piispanen |
| 6,724,342 B2 | 4/2004 | Bloebaum |
| 6,725,159 B2 | 4/2004 | Krasner |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aguilon |
| 6,741,842 B2 | 5/2004 | Goldberg |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,544 B2 | 6/2004 | Rangarajan |
| 6,772,340 B1 | 8/2004 | Peinado |
| 6,775,655 B1 | 8/2004 | Peinado et al. |
| 6,775,802 B2 | 8/2004 | Gaal |
| 6,778,136 B2 | 8/2004 | Gronomeyer |
| 6,778,885 B2 | 8/2004 | Agashe |
| 6,781,963 B2 | 8/2004 | Crockett |
| 6,788,249 B1 | 9/2004 | Farmer |
| 6,795,699 B1 | 9/2004 | McCraw |
| 6,799,050 B1 | 9/2004 | Krasner |
| 6,801,124 B2 | 10/2004 | Naitou |
| 6,801,159 B2 | 10/2004 | Swope |
| 6,804,524 B1 | 10/2004 | Vandermaijden |
| 6,807,534 B1 | 10/2004 | Erickson |
| 6,810,323 B1 | 10/2004 | Bullock |
| 6,813,560 B2 | 11/2004 | van Diggelen |
| 6,816,111 B2 | 11/2004 | Krasner |
| 6,816,710 B2 | 11/2004 | Krasner |
| 6,816,719 B1 | 11/2004 | Heinonen et al. |
| 6,816,734 B2 | 11/2004 | Wong et al. |
| 6,820,269 B2 | 11/2004 | Baucke et al. |
| 6,829,475 B1 | 12/2004 | Lee |
| 6,832,373 B2 | 12/2004 | O'Neill |
| 6,833,785 B2 | 12/2004 | Brown |
| 6,839,020 B2 | 1/2005 | Geier |
| 6,839,021 B2 | 1/2005 | Sheynblat |
| 6,842,715 B1 | 1/2005 | Gaal |
| 6,853,849 B1 * | 2/2005 | Tognazzini ............ 455/457 |
| 6,853,916 B2 | 2/2005 | Fuchs |
| 6,856,282 B2 | 2/2005 | Mauro |
| 6,861,980 B1 | 3/2005 | Rowitch et al. |
| 6,865,171 B1 | 3/2005 | Nilsson |
| 6,865,395 B2 | 3/2005 | Riley |
| 6,867,734 B2 | 3/2005 | Voor et al. |
| 6,873,854 B2 | 3/2005 | Crockett et al. |
| 6,885,940 B2 | 4/2005 | Brodie et al. |
| 6,888,497 B2 | 5/2005 | King et al. |
| 6,888,932 B2 | 5/2005 | Snip et al. |
| 6,895,238 B2 | 5/2005 | Newell et al. |
| 6,895,249 B2 | 5/2005 | Gaal |
| 6,895,324 B2 * | 5/2005 | Straub ............... 701/93 |
| 6,900,758 B1 | 5/2005 | Mann et al. |
| 6,903,684 B1 | 6/2005 | Simic et al. |
| 6,904,029 B2 | 6/2005 | Fors |
| 6,907,224 B2 | 6/2005 | Younis |
| 6,907,238 B2 * | 6/2005 | Leung ............ 455/404.1 |
| 6,912,395 B2 | 6/2005 | Benes |
| 6,915,208 B2 | 7/2005 | Garin |
| 6,917,331 B2 | 7/2005 | Gronemeyer |
| 6,930,634 B2 | 8/2005 | Peng |
| 6,937,187 B2 | 8/2005 | Van Diggelen |
| 6,937,872 B2 | 8/2005 | Krasner |
| 6,941,144 B2 | 9/2005 | Stein |
| 6,944,540 B2 | 9/2005 | King |
| 6,947,772 B2 | 9/2005 | Minear |
| 6,950,058 B1 | 9/2005 | Davis |
| 6,956,467 B1 | 10/2005 | Mercado, Jr. |
| 6,957,073 B2 | 10/2005 | Bye |
| 6,961,562 B2 | 11/2005 | Ross |
| 6,965,754 B2 | 11/2005 | King |
| 6,965,767 B2 | 11/2005 | Maggenti |
| 6,970,917 B1 | 11/2005 | Kushwaha |
| 6,973,166 B1 | 12/2005 | Tsumpes |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohles |
| 6,985,105 B1 | 1/2006 | Pitt |
| 6,996,720 B1 | 2/2006 | DeMello |
| 6,999,782 B2 * | 2/2006 | Shaughnessy et al. ........ 455/518 |
| 7,024,321 B1 | 4/2006 | Deniger |
| 7,024,393 B1 | 4/2006 | Peinado |
| 7,047,411 B1 | 5/2006 | DeMello |
| 7,064,656 B2 | 6/2006 | Bekcher |
| 7,065,351 B2 | 6/2006 | Carter |
| 7,065,507 B2 | 6/2006 | Mohammed |
| 7,079,857 B2 | 7/2006 | Maggenti et al. |
| 7,103,018 B1 | 9/2006 | Hasen |
| 7,103,574 B1 | 9/2006 | Peinado |
| 7,106,717 B2 | 9/2006 | Rosseau |
| 7,136,838 B1 | 11/2006 | Peinado |
| 7,151,946 B2 | 12/2006 | Magennti |
| 7,177,623 B2 * | 2/2007 | Baldwin .............. 455/404.2 |
| 7,209,969 B2 | 4/2007 | Lahti et al. |
| 7,218,940 B2 | 5/2007 | Niemenna |
| 7,221,959 B2 | 5/2007 | Lindquist |
| 7,301,494 B2 * | 11/2007 | Waters ............... 342/20 |
| 7,471,236 B1 * | 12/2008 | Pitt et al. ............ 342/57 |
| RE40,653 E * | 3/2009 | Fleming, III ........... 342/20 |
| 7,504,983 B2 * | 3/2009 | Chen et al. ........... 342/20 |
| 7,764,219 B2 * | 7/2010 | Pitt et al. ............ 342/20 |
| 2002/0037735 A1 | 3/2002 | Maggenti |
| 2002/0038182 A1 | 3/2002 | Wong |
| 2002/0052214 A1 | 5/2002 | Maggenti |
| 2002/0061760 A1 | 5/2002 | Maggenti |
| 2002/0069529 A1 | 6/2002 | Wieres |
| 2002/0102999 A1 | 8/2002 | Maggenti |
| 2002/0112047 A1 * | 8/2002 | Kushwaha et al. ........ 709/223 |
| 2002/0135504 A1 * | 9/2002 | Singer ............ 342/20 |
| 2002/0173317 A1 | 11/2002 | Nykanen |
| 2003/0009602 A1 | 1/2003 | Jacobs |
| 2003/0037163 A1 | 2/2003 | Kitada |
| 2003/0065788 A1 | 4/2003 | Salomaki |
| 2003/0078064 A1 | 4/2003 | Chan |
| 2003/0081557 A1 | 5/2003 | Mettala |
| 2003/0101329 A1 | 5/2003 | Lahti |
| 2003/0101341 A1 | 5/2003 | Kettler |
| 2003/0103484 A1 | 6/2003 | Oommen |
| 2003/0114157 A1 | 6/2003 | Spitz |
| 2003/0119528 A1 * | 6/2003 | Pew et al. ............ 455/456 |
| 2003/0151507 A1 | 8/2003 | Andre |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0204640 A1 | 10/2003 | Sahinaja |
| 2003/0223381 A1 | 12/2003 | Schroderus |
| 2004/0002326 A1 | 1/2004 | Maher |
| 2004/0044623 A1 | 3/2004 | Wake |
| 2004/0064550 A1 | 4/2004 | Sakata |
| 2004/0068724 A1 | 4/2004 | Gardner |
| 2004/0090121 A1 | 5/2004 | Simonds |
| 2004/0204806 A1 | 10/2004 | Chen |
| 2004/0205151 A1 | 10/2004 | Sprigg |
| 2004/0229632 A1 | 11/2004 | Flynn |
| 2005/0003797 A1 * | 1/2005 | Baldwin .............. 455/404.1 |
| 2005/0028034 A1 | 2/2005 | Gantman |
| 2005/0039178 A1 | 2/2005 | Marolia |
| 2005/0041578 A1 | 2/2005 | Huotari |
| 2005/0086467 A1 | 4/2005 | Asokan |
| 2005/0112030 A1 | 5/2005 | Gauss |
| 2005/0209995 A1 | 9/2005 | Aksu |
| 2005/0259675 A1 | 11/2005 | Tuohino |
| 2006/0053225 A1 | 3/2006 | Poikleska |

| | | | | | | |
|---|---|---|---|---|---|---|
| 2006/0132349 A1* | 6/2006 | Stern et al. ............... 342/20 | 2007/0207797 A1* | 9/2007 | Pitt et al. ............... 455/422.1 |
| 2006/0212558 A1 | 9/2006 | Sahinoja | 2009/0015461 A1* | 1/2009 | Pitt et al. ............... 342/57 |
| 2006/0212562 A1 | 9/2006 | Kushwaha | 2009/0079614 A1* | 3/2009 | Pitt et al. ............... 342/20 |
| 2006/0234639 A1 | 10/2006 | Kushwaha | 2010/0214148 A1* | 8/2010 | Kuhn ............... 342/20 |
| 2006/0234698 A1 | 10/2006 | Folk | 2010/0214149 A1* | 8/2010 | Kuhn ............... 342/20 |
| 2007/0026854 A1 | 2/2007 | Nath | 2010/0238065 A1* | 9/2010 | Pitt et al. ............... 342/20 |
| 2007/0030539 A1 | 2/2007 | Nath | | | |
| 2007/0042765 A1 | 2/2007 | Bailin | * cited by examiner | | |

FIG. 5

CELLULAR AUGMENTED RADAR/LASER DETECTOR

The present application is a continuation of U.S. patent application Ser. No. 12/289,116 to PITT et al., entitled "Cellular Augmented Radar/Laser Detector," filed on Oct. 21, 2008 now U.S. Pat. No. 7,764,219, which in turn is a continuation of U.S. patent application Ser. No. 11/400,278 to PITT et al., entitled "Cellular Augmented Radar/Laser Detector," filed on Apr. 10, 2006 now U.S. Pat. No. 7,471,236, which in turn claims priority from U.S. Provisional Application 60/777,541 to PITT et al. entitled "Cellular Augmented Radar/Laser Detector," filed on Mar. 1, 2006 the entirety of all of which are expressly incorporated herein by reference.

BACKGROUND OF THE INVENTION

1. Field of the Invention

This invention relates generally to wireless telecommunications. More particularly, it relates to the combination of cellular communication technology with radar/laser detection technology.

2. Background of the Related Art

Radar detectors are well known, as are laser detectors. Radar detectors detect radio frequency emissions in a given frequency range. Laser detectors detect an impinging laser beam directed toward the detector.

In a popular application, radar or laser detectors are used for automobiles, and are often quite small and many times are battery operated to eliminate the need for power cords. A modern radar or laser detector can run for 60 to 90 days on two AA 1.5 v cell batteries, so their power needs are relatively small. Radar or laser detectors detect the presence of any of a variety of radar or laser emissions. They warn a driver of a vehicle of an impending radar trap by emitting an audible and/or visible warning indicating the detection of radar impinging upon the antenna of the radar device. For instance, different audio tones may be sounded representing each type of detection. Technology attempts to increase the amount of advance warning given to the driver.

Thus, any given radar detector warns the occupants and particularly the driver of any given vehicle, some giving more warning time than others. A driver of the vehicle must react immediately to avoid consequences related to being detected by the radar or laser. Ideally, this is sufficient time to avoid the consequences, but in many instances it may already be too late as at that point the speed of the vehicle may have already been measured. This is particularly true if the operator of the radar or laser emission is pointing and shooting once the driver's vehicle comes into range.

Vehicles to follow may suffer the same fate, especially since they at best will not receive any earlier warning of the detection of radar or laser than did the driver before. This is because a driver is warned about emissions that their device detects directly.

There is a need for providing earlier warning to users of radar and/or laser detectors.

SUMMARY OF THE INVENTION

In accordance with the principles of the present invention, a cellular augmented emission detection device comprises a radar emission detector element, and a signal processor to process detection made by the radar emission detector element. Importantly, a cellular front end is in direct communication with the signal processor. A warning is initiated from the cellular augmented emission detection device upon receipt of information over the cellular front end relating to detection of radar emission not detected by the radar emission detector element but rather by another cellular augmented emission detection device.

In another aspect, a cellular augmented emission detection device comprises a laser emission detector element, and a signal processor to process detection made by the laser emission detector element. Importantly, a cellular front end is in direct communication with the laser signal processor. A warning is initiated from the cellular augmented emission detection device upon receipt of information over the cellular front end relating to detection of laser emission not detected by the laser emission detector element but rather by another cellular augmented emission detection device.

A method of passing radar or laser emission data from one radar/laser detector device to another in accordance with yet another aspect of the invention comprises augmenting a radar/laser emission detector with a cellular front end. A transmission is initiated over the cellular front end, and information related to detection of radar or laser is passed by the augmented radar/laser emission detector in the initiated transmission.

Another method of passing radar or laser emission data from one radar/laser detector device to another comprises augmenting a radar/laser emission detector with a cellular front end, and receiving information over the cellular front end relating to detection of radar or laser by another radar/laser detector at a time that the radar or laser emission detector is not detecting emission.

BRIEF DESCRIPTION OF THE DRAWINGS

FIG. 5 shows an exemplary CARDloc table including identifier, location (latitude and longitude), and optimization indices, in a CARD local mobile net in accordance with the principles of the present invention.

DETAILED DESCRIPTION OF ILLUSTRATIVE EMBODIMENTS

The present invention isn't so much a remedy for a problem with the existing technology as it is a significant enhancement to the existing technology.

Being warned about radar or laser emissions detected by ones own device gives some advance warning. However, the present invention provides warnings about emissions detected by other detection devices on the road ahead of the driver. This significantly increases the amount of advance time of warning, giving the driver much more time to react.

In accordance with the principles of the present invention, automatic sharing of emission detection information is provided among drivers of separate vehicles by combining or augmenting an otherwise conventional radar or laser detector with a cellular communication front end. This makes it possible for one emission detector device to share its information with other devices, e.g., similarly capable cellular augmented radar devices.

Modern radar/laser detector devices have very low battery consumption requirements and provide some warning of nearby radar and/or laser emissions. Typically these devices emit an audio tone when emissions are detected. The warning tone is audible within the vehicle so that the driver (and any passengers) within the vehicle will receive warning.

Modern cellular communication devices have higher battery consumption requirements but also have much more powerful batteries. Cellular communication devices have the ability, through a wireless network, to share analog and digital information with other cellular communication devices.

A hybrid device in accordance with the present invention preferably has the ability to detect both radar and laser emissions, though detection of only radar emission or only laser emission is within the scope of the present invention.

Importantly, the device includes the ability to communicate via a cellular network. Such use of the cellular front end is relatively small, and wouldn't require any more battery capacity than is already provided for the cellular device. For instance, communication on the wireless network is preferably performed only when detection of emission occurs. Preferably, upon detection of emission, the cellular front end may be activated to allow the hybrid device to report to an established mobile network that detection has occurred.

Receiving devices may be provided with advance warning by polling their wireless network, e.g., by dialing a central database containing current detection information.

The size of the device need not be much bigger than an otherwise conventional radar detector devices, as a keypad and a large LCD display as provided by most mobile cellular devices is not required. The hybrid device need be larger only to include a cellular antenna, and if desired to include a larger battery, space for the cellular processor card, etc.

Figure 1:
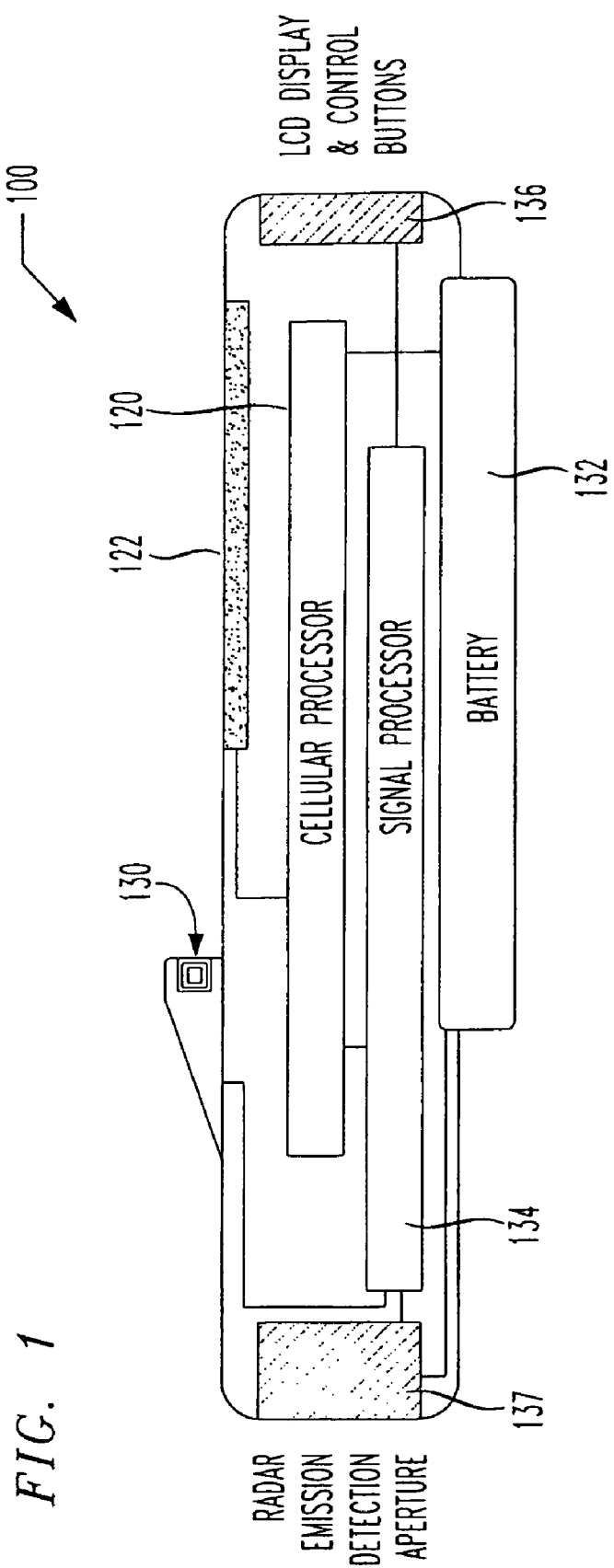
FIG. 1 shows a hybrid radar/laser detector device including cellular communications capability, in accordance with the principles of the present invention.

FIG. 1 shows a hybrid radar/laser detector device including cellular communications capability, in accordance with the principles of the present invention.

In particular, a cellular augmented radar/laser detection device 100 as shown in FIG. 1 provides the capability to share emission detection information amongst drivers to give those drivers even more advanced warning. The cellular augmented radar/laser detection device 100 includes a cellular processor front end 120 together with an associated cellular antenna 122. The cellular augmented radar/laser detection device 100 also includes otherwise conventional radar/laser emission detection components, including a laser emission detector 130, a radar emission detector 137, a battery 132, an emission signal processor 134, and front panel user interface 136 including LCD display and control buttons.

Of course, the cellular processor front end 120 and emission signal processor 134, and any other components within the cellular augmented radar/laser detection device 100, may be integrated with one another into a common physical component.

Figure 2:
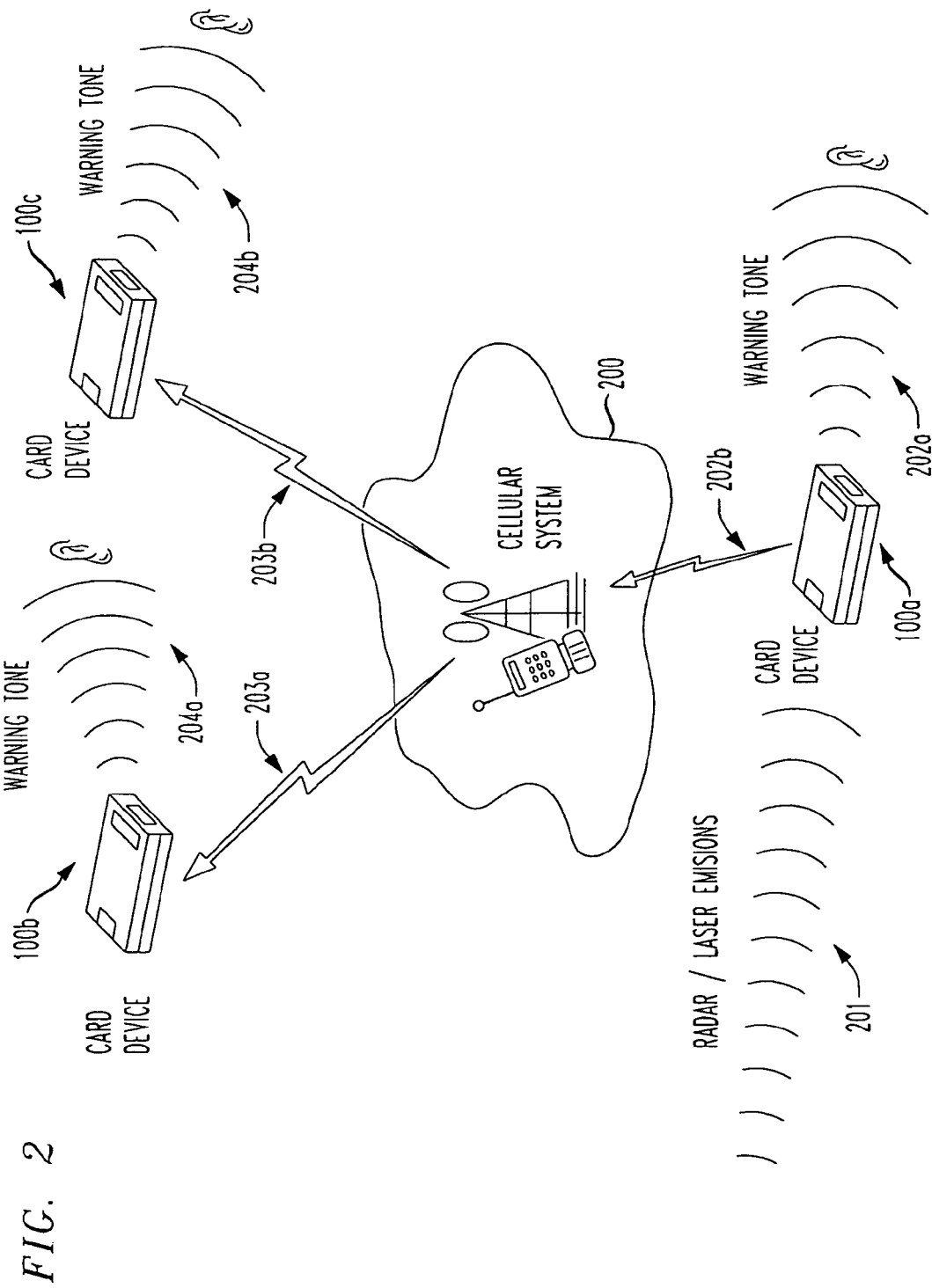
FIG. 2 shows a plurality of hybrid radar/laser emission detector devices each having the capability to source the location of radar or laser emission detections, and each being warned when within a proximity of a recent radar or laser emission detection reported by at least one of the plurality of hybrid radar/laser detector devices, in accordance with the principles of the present invention.

FIG. 2 shows a plurality of hybrid radar/laser emission detector devices each having the capability to source the location of radar or laser emission detections, and each being warned when within a proximity of a recent radar or laser emission detection reported by at least one of the plurality of hybrid radar/laser detector devices, in accordance with the principles of the present invention.

In particular, as shown in FIG. 2, radar or laser emissions 201 detected by a cellular augmented radar detector (CARD) device warns the driver of that vehicle 202*a* via audible tone, but also importantly relays the detection information digitally 202*b* to a cellular network system 200. For instance, in the given example of FIG. 2, relayed detection information is transmitted to other CARD devices 203*a*, 203*b* via the cellular network 200. The CARD devices 203*a*, 203*b* then warns their respective drivers in those vehicles of the remote detection of radar or laser by another networked CARD device 100*a*. The warning may be via audible tone 204*a*, 204*b*. Preferably, the audible tone 204*a*, 204*b* is distinctive from an audible tone otherwise emitted as a result of direct detection of radar or laser by the respective CARD device 100*b*, 100*c* itself.

Ideally, only CARD devices 100*b*, 100*c* within proximity of the source of a CARD device 100*a* directly detecting emission of radar or laser emission are notified. This may be accomplished in a number of different ways. For instance, CARD device users with given phone number area codes may be presumed to be primarily within a given physical area serviced by those area codes, but this is not at all accurate and can result in erroneous warning. Warning a CARD device owner that another CARD device has detected radar or laser emissions is impractical and at the least annoying if the detection isn't in relatively close proximity.

CARD devices themselves are unable to determine which other CARD devices are in close proximity. The problem is aggravated because the use of cellular technology enables CARD devices to communicate with other CARD devices anywhere in the world.

In accordance with the present invention, Mobile Position Centers (MPCs) are provided in ANSI-41 networks and Gateway Mobile Location Centres (GMLCs) are provided in GSM networks, to enable the capability to find CARD devices within a configurable proximity limit of any "announcing" CARD device (i.e. any CARD device that is broadcasting an emission detection warning). Thus, once a CARD device detects emission, it reports via a cellular network to an application that then identifies other proximate CARD devices via query to an MPC (or GMLC), and transmits a detection warning message to only the CARD devices that are identified as currently being proximate to the detecting CARD device at the time of the detection and query.

MPCs and GMLCs are known and currently in operation to enable location services for locating a given mobile device. However, current MPCs or GMLCs do not provide a proximity determination service. In accordance with the principles of the present invention, location information available from MPCs and/or GMLCs for every querying CARD device provides the identity of all other CARD devices that are in close proximity to the querying (and emission detecting) CARD device. This enables the formation of a temporary local "network" based on a current proximity to one another. In this way, CARD devices are able to share emission detection information with only those CARD devices that will find the information useful and practical.

Thus, practical localized sharing of digital information is accomplished over a network of physically proximate devices, all of which being part of a global network. This local area network, otherwise called a mobile area wireless network (MAWN), makes interaction of Cellular Augmented Radar Detector (CARD) devices practical. Armed with proximity information, emission detection broadcasts are transmitted only to CARD devices in close proximity to the sourcing CARD device.

Figure 3:
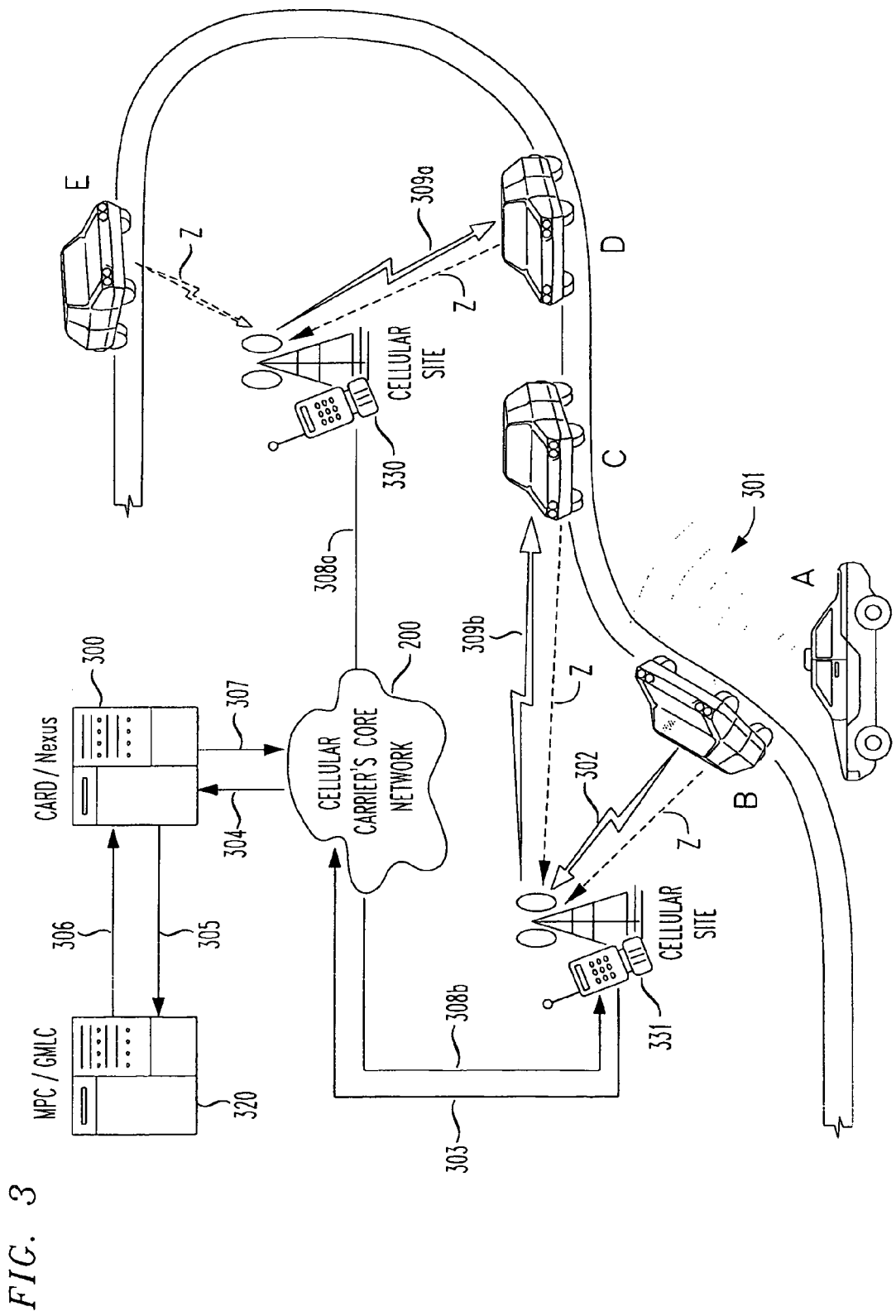
FIG. 3 shows an exemplary Cellular Augmented Radar Detector (CARD) local mobile net, in accordance with the principles of the present invention.

FIG. 3 shows an exemplary Cellular Augmented Radar Detector (CARD) local mobile net, in accordance with the principles of the present invention.

In particular, as shown in FIG. 3, a "CARD announcement coordination processor" or "CARD Nexus" gateway 300 ensures that CARD announcements are relayed only to those CARD devices for which the relevant announcement is pertinent.

The CARD Nexus gateway 300 may be a fully qualified Mobile Position Center (for ANSI-41 networks) or a fully qualified Gateway Mobile Location Centre (for GSM networks). The CARD Nexus gateway 300 also includes proximity evaluation logic. In an alternative, more practical architecture, only the proximity evaluation logic is implemented in the CARD Nexus gateway 300. A CARD Nexus interface is implemented with an MPC/GMLC 320 to get the location(s) for each of the operating CARD devices. The given embodiments show a system utilizing a CARD Nexus gateway 300 that works with a separate MPC/GMLC 320.

The disclosed embodiments prefer that CARD devices that are powered off will not interact with the CARD Nexus in any way. The disclosed embodiments also presume that any CARD device that is not enabled for cellular broadcast will not interact with the CARD Nexus in any way. CARD devices that are powered on but not enabled for cellular broadcast would function in otherwise the same manner as otherwise conventional radar detectors, i.e., they detect radar and laser emissions and emit an audible warning tone only to the driver and passengers within the vehicle in which the CARD device is mounted.

CARD devices that are powered on and enabled to broadcast via its cellular subsystem periodically connect (z in FIG. 3) to the cellular system to allow the CARD Nexus gateway 300 to determine that CARD device's current location. The CARD Nexus gateway 300 accesses the MPC/GMLC 320 to determine the CARD's location, and then saves the CARD's identity with its newly determined location (hereafter referred to as "CARDloc") in a relational database for easy retrieval during proximity evaluation.

When a CARD device (e.g., device B in FIG. 3) that is powered ON and enabled to broadcast via its cellular subsystem detects either radar or laser emissions 301, it issues an emission detection announcement 302. The emission detection announcement 302 is routed through the hosting cellular carrier's core network 303, 304 to the CARD Nexus gateway 300.

The CARD Nexus gateway 300 determines the current location of the announcing CARD device by interfacing 305, 306 with the MPC/GMLC 320, and then accesses a relational database to identify other CARD devices in close proximity to the announcing device (C and D but not E).

The term "close proximity" may be predefined by the CARD Nexus system operator based on linear distance. Alternatively, close proximity may be defined on a device by device basis, or even defined within each query from the announcing CARD device to the CARD Nexus gateway 300.

Close proximity may alternatively be defined as a shortest distance based on length of roads to the announcing CARD device, but this approach requires route calculations for each CARD device and thus will be significantly slow unless the processor of the CARD Nexus is capable of making such route calculations in a timely manner.

The CARD Nexus gateway 300 then issues warnings 307, 308a, 308b to those CARD devices within the designated proximity so that relayed warnings 309a, 309b will alert the passengers of those vehicles.

For the purposes of this invention, close proximity evaluation methodology is designed for speed of performance during proximity evaluation processing. Thus, the CARD Nexus gateway 300 reduces a CARD device's location, represented in decimal degrees of latitude and longitude, into indices of latitude and indices of longitude within four (4) layers, and makes a simple calculation of a linear distance between an announcing CARD device and each potentially proximate CARD device:

| 1) | Primary: | tens of degrees | (~700 statute mile resolution) |
|----|----------|-----------------|--------------------------------|
| 2) | Secondary: | Degrees | (~70 statute mile resolution) |
| 3) | Tertiary: | minutes | (~6000 foot resolution) |
| 4) | Quaternary: | seconds | (~100 foot resolution) |

Figure 4:
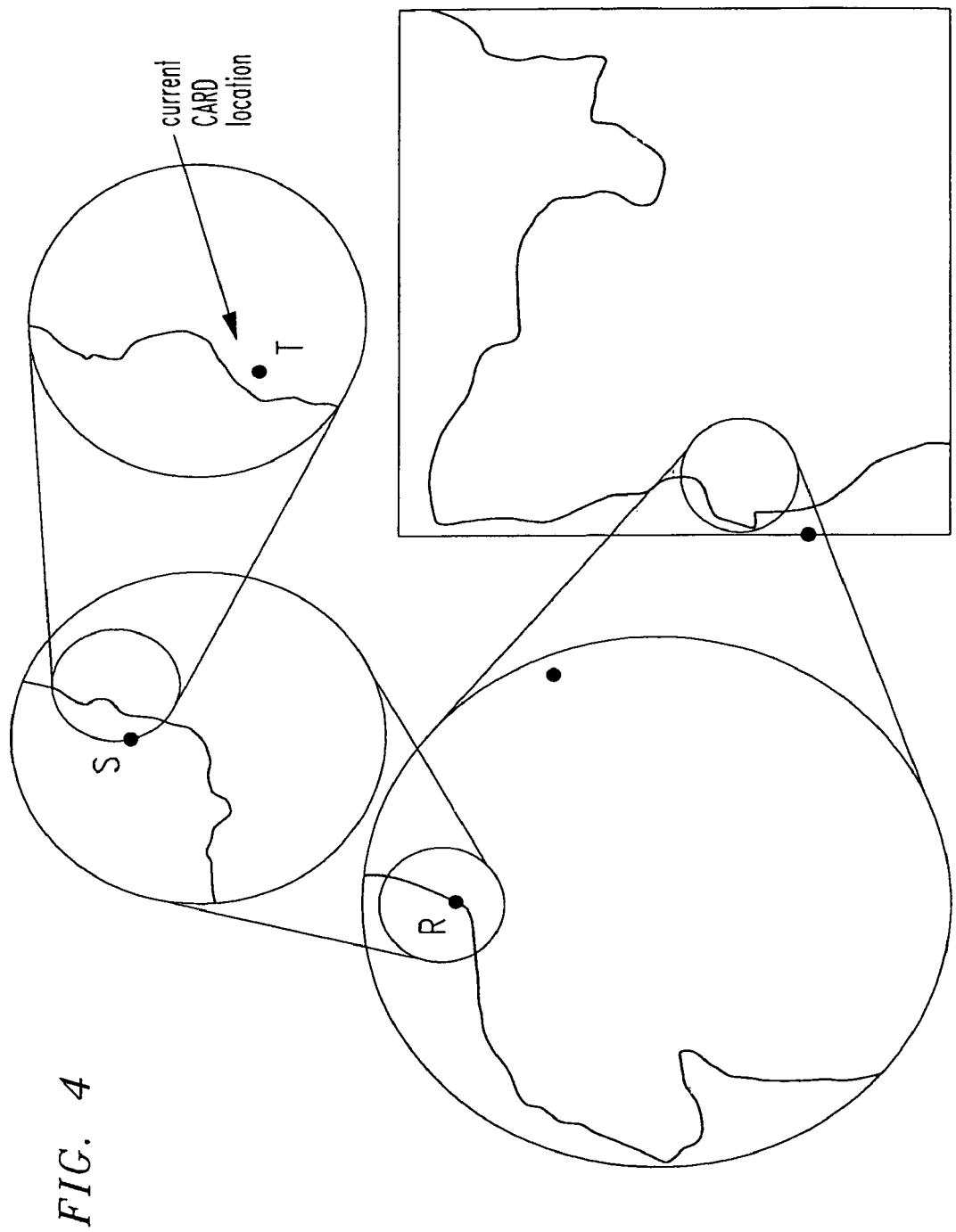
FIG. 4 shows figurative coverage of the Earth's surface with successively finer grained gridlines, in accordance with the principles of the present invention.

FIG. 4 shows figurative coverage of the Earth's surface with successively finer grained gridlines, in accordance with the principles of the present invention.

In particular, as shown in FIG. 4, seconds of latitude and longitude yield a grid whose vertices are approximately 100 feet apart at the equator and somewhat closer together the farther away from the equator (North or South) the CARD device is located. Should the need arise to attain even finer granularity than seconds, a fifth (Quinary) and even sixth (Senary) layer can be added to represent 10ths of seconds (~10 feet) and 100ths of seconds (~12 inches).

Figure 5:
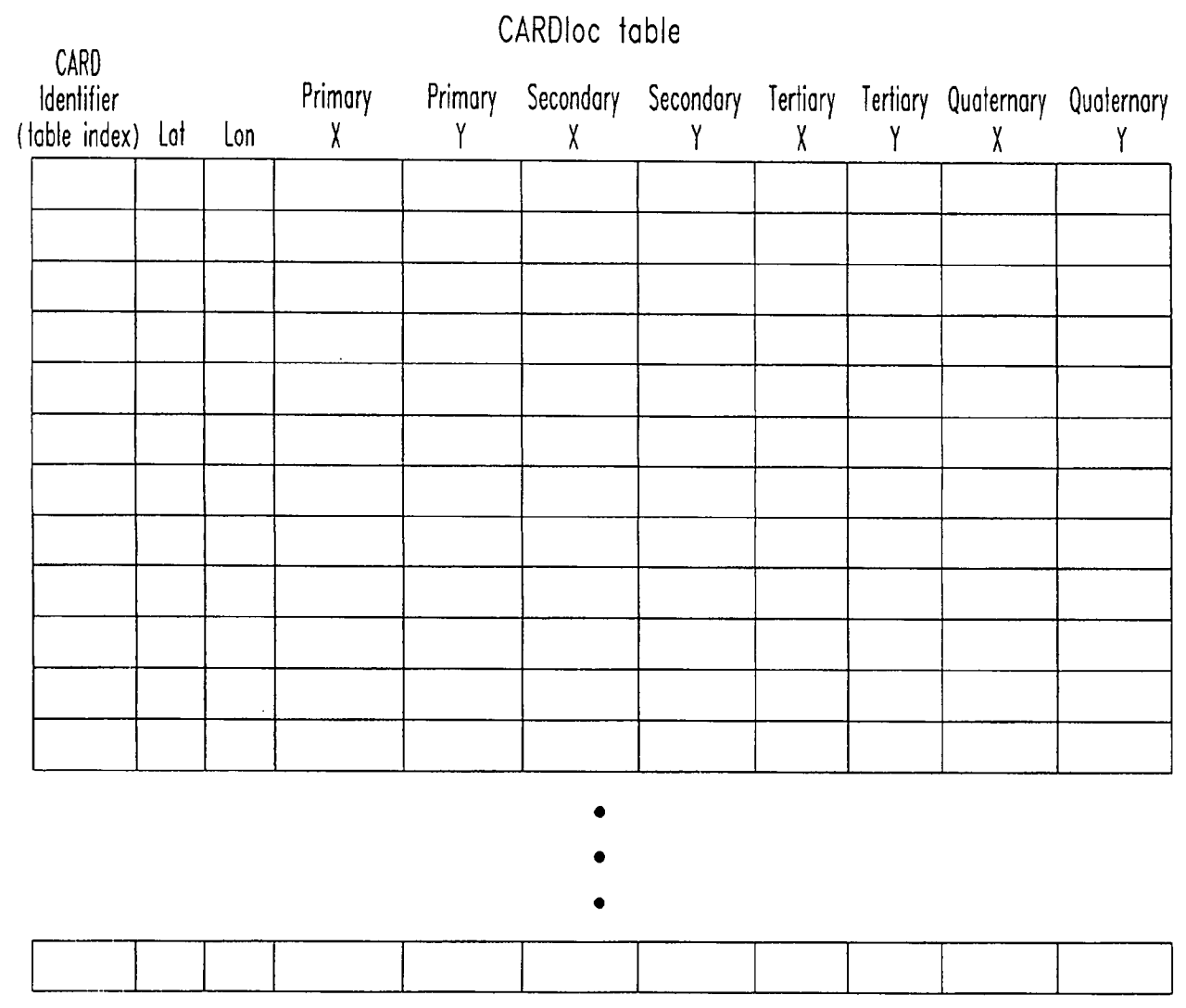

FIG. 5 shows an exemplary CARDloc table including identifier, location (latitude and longitude), and optimization indices, in a CARD local mobile net in accordance with the principles of the present invention.

In particular, every time a CARD device notifies the CARD Nexus gateway 300 (CARDloc) or makes an emission detection announcement, the CARD Nexus gateway 300 saves that CARD's identifier, location (latitude and longitude), and optimization indices in a CARDloc table as exemplified in FIG. 5.

The Lat and Lon values are normalized to be decimal degrees in the range −90.0 through +90.0 for Latitude and −180.0 through +180.0 for Longitude. The indices are computed as follows:

| | |
|---|---|
| PrimaryX = | int( round(( Lon / 10.0 ) − 0.5)) |
| PrimaryY = | int( round(( Lat / 10.0 ) − 0.5)) |
| SecondaryX = | int( truncate( Lon − (PrimaryX * 10.0))) |
| SecondaryY = | int( truncate( Lat − (PrimaryY * 10.0))) |
| TertiaryX = | int( truncate((Lon − ((PrimaryX * 10.0) + SecondaryX )) * 60.0)) |
| TertiaryY = | int( truncate((Lat − ((PrimaryY * 10.0) + SecondaryY )) * 60.0)) |
| QuaternaryX = | int( truncate((Lon − ((PrimaryX * 10.0) + SecondaryX + (TertiaryX/60.0))) * 3600.0)) |
| QuaternaryY = | int( truncate((Lat − ((PrimaryY * 10.0) + SecondaryY + (TertiaryY/60.0))) * 3600.0)) |

These equations presume that the round( ) function always rounds an "n.5" value up, so that 0.5 becomes 1.0, 2.5 becomes 3.0, −3.5 becomes −3.0, etc. Some adjustments might be necessary to accommodate specific hardware architectures, operating systems, and compilers.

The intent, though, is to compute an index based on the lower left corner of the square in which the CARD is located.

The primary square (Q) is a 10 degree by 10 degree square. The secondary square (R) is a one degree by one degree square located within the primary. The tertiary square (S) is a one minute by one minute square located within the secondary. The quaternary square (T) is a one second by one second square located within the tertiary.

These computations produce values in the following ranges:

| | |
|---|---|
| −18 <= PrimaryX <= 18 | −9 <= PrimaryY <= 9 |
| 0 <= SecondaryX <= 9 | 0 <= SecondaryY <= 9 |
| 0 <= TertiaryX <= 60 | 0 <= TertiaryY <= 60 |
| 0 <= QuaternaryX <= 60 | 0 <= QuaternaryY <= 60 |

Figure 6:
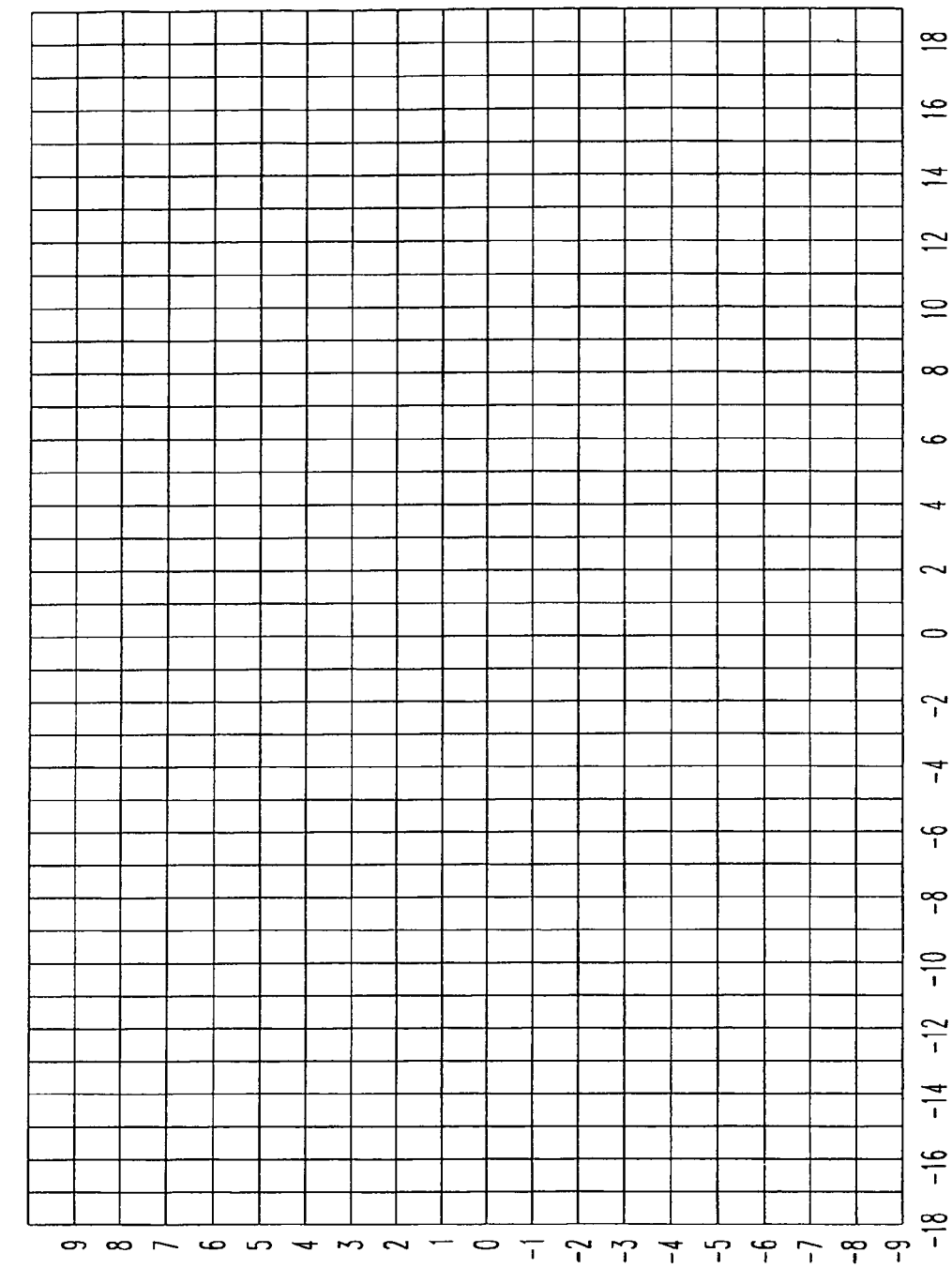
FIG. 6 shows a matrix for Primary indices for a CARD nexus that maintains a collection of matrices in Random Access Memory (RAM), i.e., not in a relational database, in accordance with the principles of the present invention.

FIG. 6 shows a matrix for primary indices for a CARD Nexus gateway 300 that maintains a collection of matrices in temporary memory such as Random Access Memory (RAM), i.e., not in a relational database, in accordance with the principles of the present invention.

A collection of matrices in accordance with the principles of the present invention preferably always includes a matrix for the primary indices, as shown in FIG. 6.

The primary matrix is preferably accompanied by a PrimaryCount indicating how many CARDS are present.

The Primary Matrix is also preferably accompanied by an array or list of the primary matrix elements in which CARDs can be found (list will be empty if PrimaryCount is zero).

Each element in the 36×18 Primary matrix preferably contains: (1) A count of how many CARDs are present in that particular 10 deg×10 deg area; and (2) reference to a secondary matrix (reference will be NULL if count is zero).

Secondary (10×10 matrix), tertiary (60×60), and quaternary (60×60) matrices will be allocated, maintained, and eliminated as needed to manage memory use in the CARD Nexus gateway 300.

Each secondary matrix is preferably accompanied by a SecondaryCount indicating how many CARD devices are present in that 10 deg×10 deg area.

Each secondary matrix is also preferably accompanied by an array or list of the secondary matrix elements in which CARDs can be found. (Note that the list will be empty if its SecondaryCount is zero.)

Each element in a 10×10 secondary matrix preferably contains: (1) count of how many CARDs are present in that particular 1 deg×1 deg area; and (2) reference to a tertiary matrix. (Note that the reference will be NULL if the count is zero).

Each tertiary matrix is preferably accompanied by a TertiaryCount indicating how many CARDs are present in that 1 deg×1 deg area.

Each tertiary matrix is preferably accompanied by an array or list of the tertiary matrix elements in which CARDs can be found. (Note that the list will be empty if its TertiaryCount is zero.)

Each element in a 60×60 tertiary matrix preferably contains: (1) A count of how many CARDs are present in that particular 1 minute×1 minute area; and (2) a reference to a quaternary matrix. (Note that the reference will be NULL if the count is zero.)

Each quaternary matrix is preferably accompanied by a QuaternaryCount indicating how many CARDs are present in that 1 min×1 min area.

Each quaternary matrix is preferably accompanied by an array or list of the quaternary elements in which CARDs can be found. (Note that the list will be empty if QuaternaryCount is zero.)

Each element in a 60×60 quaternary matrix preferably contains: (1) A count of how many CARDs are present in that particular 1 second×1 second area; and (2) An array or list of CARD Identifiers that are present in the 1 sec×1 sec area. (Note that the list will be empty if count is zero.)

This four (4) tier data structure makes it possible for the CARD Nexus gateway 300 to rapidly identify all of the CARD devices in close proximity to an announcing CARD device so that warnings can be relayed in a timely manner. Maintenance of this four (4) tier structure is complex but will be clearly understood by those of ordinary skill in data structures.

Proximity can be a configured reference value defined in terms of hundreds of feet, thousands of feet, tens of miles, hundreds of miles, etc. Regardless of the defined distance for 'proximate', the CARD Nexus gateway 300 is able to rapidly identify which CARD devices meet the criteria. The broader the proximity value is defined, though, the longer it will generally take the CARD Nexus gateway 300 to send all the notifications due to latencies imposed by the carrier's core network.

The invention has particular applicability with people driving ground transportation. Moreover, the use of a mobile area wireless network using cellular technology can be expanded to include the sharing of other relevant vehicle information with proximate other vehicles communicating together on a cellular local area network. For instance, vehicles may advertise to other proximate vehicles that they are accelerating, braking, emergency braking, or beginning to change lanes. This technology may also lead to the ability to foster auto-piloting of a vehicle. Buses may advertise to their next bus stop how far away they are and what their estimated arrival time is. Airplanes may advertise to other planes what their speed is, what their altitude is, and what their heading is, to provide more automated collision avoidance.

While the invention has been described with reference to the exemplary embodiments thereof, those skilled in the art will be able to make various modifications to the described embodiments of the invention without departing from the true spirit and scope of the invention.

What is claimed is:

1. A first cellular augmented emission detection physical device, comprising:
   an emission detector to identify an emission within a vicinity of a first physical cellular augmented emission detection device; and
   a cellular transmitter to transmit a first emission announcement to a physical emission notification gateway; and
   a receiver to receive a second emission announcement from a second physical cellular augmented emission detection device via said physical emission notification gateway;
   wherein said physical emission notification gateway transmits said second emission announcement in response to a determination of a shortest distance based on a length of road between said first physical cellular augmented emission detection device and said second physical cellular augmented emission detection device.

2. The cellular augmented emission detection device according to claim 1, wherein:
   said second emission announcement triggers an audible warning at said first physical cellular augmented emission detection device.

3. The cellular augmented emission detection device according to claim 1, wherein said first emission announcement comprises:
   a phone call.

4. The cellular augmented emission detection device according to claim 1, wherein said first emission announcement comprises:
   a data packet.

5. The cellular augmented emission detection device according to claim 1, wherein said first emission announcement comprises:
   a call to a central database.

6. A method of transmitting an emission detection from one cellular augmented emission detection device to another, comprising:
   identifying an emission within a vicinity of a first physical cellular augmented emission detection device;
   transmitting, from said first physical cellular augmented emission detection device to a physical emission notification gateway, a first emission announcement; and
   receiving, at said first physical cellular augmented emission detection device, a second emission announcement from a second physical cellular augmented emission detection device via said physical emission notification gateway;
   wherein said physical emission notification gateway transmits said second emission announcement in response to a determination of a shortest distance based on a length of road between said first physical cellular augmented emission detection device and said second physical cellular augmented emission detection device.

7. The method of transmitting an emission detection from one cellular augmented emission detection device to another according to claim 6, further comprising:
   triggering an audible warning at said first physical cellular augmented emission detection device.

8. The method of transmitting an emission detection from one cellular augmented emission detection device to another according to claim 6, wherein:
   said identifying said emission identifies a laser emission detected by said first physical cellular augmented emission detection device.

9. The method of transmitting an emission detection from one cellular augmented emission detection device to another according to claim 6, wherein said transmission of said first emission notification announcement comprises:
   initiating a phone call.

10. The method of transmitting an emission detection from one cellular augmented emission detection device to another according to claim 6, wherein said transmission of said first emission announcement comprises:
   forming a data packet.

11. The method of transmitting an emission detection from one cellular augmented emission detection device to another according to claim 6, wherein said transmission of said first emission announcement comprises:
   initiating a call to a central database.

* * * * *